US012129105B2

(12) United States Patent
Hodges

(10) Patent No.: US 12,129,105 B2
(45) Date of Patent: Oct. 29, 2024

(54) PACKAGE

(71) Applicant: British American Tobacco (Investments) Limited, London (GB)

(72) Inventor: Paul Hodges, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 0 days.

(21) Appl. No.: 17/633,569

(22) PCT Filed: Jul. 30, 2020

(86) PCT No.: PCT/GB2020/051823
§ 371 (c)(1),
(2) Date: Feb. 7, 2022

(87) PCT Pub. No.: WO2021/028652
PCT Pub. Date: Feb. 18, 2021

(65) Prior Publication Data

US 2022/0363467 A1 Nov. 17, 2022

(30) Foreign Application Priority Data

Aug. 15, 2019 (GB) ..................................... 1911720

(51) Int. Cl.
*B65D 85/10* (2006.01)
*B65D 5/66* (2006.01)
*B31B 120/10* (2017.01)

(52) U.S. Cl.
CPC ......... *B65D 85/1056* (2020.05); *B65D 5/662* (2013.01); *B31B 2120/102* (2017.08); *B31B 2241/003* (2013.01)

(58) Field of Classification Search
CPC .............. B65D 5/662; B65D 85/10564; B65D 85/1056; B31B 2241/003
(Continued)

(56) References Cited

U.S. PATENT DOCUMENTS 5,678,690 A * 10/1997 Belvederi .......... B65D 85/1056 206/268
5,725,144 A * 3/1998 Stone .................. B65D 5/6608 229/101
(Continued)

FOREIGN PATENT DOCUMENTS

CA 2069686 A1 12/1992
DE 102017007130 A1 1/2019
(Continued)

OTHER PUBLICATIONS

International Search Report and Written Opinion for Application No. PCT/GB2020/051823, dated Oct. 29, 2020, 9 pages.
(Continued)

*Primary Examiner* — Rafael A Ortiz
(74) *Attorney, Agent, or Firm* — Husch Blackwell

(57) ABSTRACT

The present disclosure relates to a package for a delivery system. The package includes a container and a lid hingedly connected to the container about a hinge line, and an inner frame received in the container. The inner frame has a portion that extends from the container which is received in the lid when the lid is closed. The package further includes a raised seal line that is formed on the portion of the inner frame and/or on an inner surface of the lid. The raised seal line is configured to minimize a gap between the portion of the inner frame and the inner surface of the lid when the lid is closed. The present disclosure also relates to a method of manufacturing the package.

19 Claims, 9 Drawing Sheets

(58) Field of Classification Search
USPC .................................................. 206/268, 259
See application file for complete search history.

(56) References Cited

U.S. PATENT DOCUMENTS

| | | | | |
|---|---|---|---|---|
| 6,591,982 | B2 * | 7/2003 | Focke ................ | B65D 85/1048 206/268 |
| 2012/0000801 | A1 * | 1/2012 | Gibson ................ | B65D 5/6691 206/268 |
| 2018/0134493 | A1 | 5/2018 | Cunningham et al. | |

FOREIGN PATENT DOCUMENTS

| | | | | | |
|---|---|---|---|---|---|
| EP | 0507112 | A2 | | 10/1992 | |
| EP | 0801010 | A1 | | 10/1997 | |
| EP | 3251971 | A1 | * | 12/2017 | ............. A24F 15/12 |
| EP | 3251972 | A1 | * | 12/2017 | ......... A24F 85/1054 |
| GB | 2151212 | A | | 7/1985 | |
| JP | H05213340 | A | | 8/1993 | |
| JP | 2012510934 | A | | 5/2012 | |
| WO | WO-0149577 | A1 | * | 7/2001 | ............. B65D 5/543 |
| WO | 2010063569 | A1 | | 6/2010 | |
| WO | WO-2013068500 | A1 | * | 5/2013 | ......... B65D 85/1054 |
| WO | 2013145076 | A1 | | 10/2013 | |
| WO | WO-2015165999 | A1 | * | 11/2015 | ............... B65D 5/38 |
| WO | WO-2016016376 | A1 | * | 2/2016 | ........... B65D 5/6611 |
| WO | WO-2016139170 | A1 | * | 9/2016 | ....... B65D 85/10484 |

OTHER PUBLICATIONS

International Preliminary Report on Patentability received for PCT Patent Application No. PCT/GB2020/051822, dated Feb. 24, 2022, 8 pages.

International Preliminary Report on Patentability received for PCT Patent Application No. PCT/GB2020/051823, dated Feb. 24, 2022, 8 pages.

International Search Report and Written Opinion received for PCT Patent Application No. PCT/GB2020/051822, dated Oct. 30, 2020, 10 pages.

Office Action received for Russian Patent Application No. 2022103674, dated Oct. 10, 2022, 12 pages (6 pages of English Translation and 6 pages of Official Copy).

"Office action received for Canadian Patent Application No. 3150416, dated Mar. 3, 2023", 4 pages.

"Office Action received for Japanese Patent Application No. 2022-509007, dated May 30, 2023", 2 pages (Official Copy Only).

Brazilian Office Action in BR Appln. No. BR 1120220028016, dated Jan. 5, 2024, 4 pages.

* cited by examiner

PACKAGE

PRIORITY CLAIM

The present application is a National Phase entry of PCT Application No. PCT/GB2020/051823, filed Jul. 30, 2020, which claims priority from GB Patent Application No. 1911720.9, filed Aug. 15, 2019, which is hereby fully incorporated herein by reference.

TECHNICAL FIELD

The present disclosure relates to a package for one or more delivery systems. In particular, the disclosure relates to a hinge-lid package for delivery systems, such as smoking articles, but is not limited thereto.

BACKGROUND

Hinge-lid packages are known to those skilled in the art and are in widespread use in the tobacco industry for holding delivery systems, such as smoking articles like cigarettes, in a crush resistant manner. Hinge-lid packages are typically produced from cardboard blanks.

However, conventional hinge-lid packages have a tendency to not close properly such that the contents of the package can become soiled by contaminants such as moisture and/or dirt. One option to keep hinge-lid packages closed has been to use locking mechanisms in an attempt to keep the package fully closed. However, the locking mechanisms themselves can be damaged so that they cannot perform their function and also make the package complex to manufacture.

SUMMARY

According to embodiments of the present disclosure, there is provided a package for delivery systems comprising a container and a lid hingedly connected to the container about a hinge line, an inner frame received in the container and having a portion that extends from the container which is received in the lid when the lid is closed, wherein a raised seal line is formed on said portion of the inner frame and/or on an inner surface of the lid, said raised seal line being configured to minimize a gap between said portion of the inner frame and the inner surface of the lid when the lid is closed.

The raised seal line may contact the inner frame and the lid when the lid is in its closed position.

The container may comprise and upper edge spaced from an upper edge of the inner frame, and the raised seal line may contact the inner frame between the upper edge of the container and the upper edge of the inner frame when the lid is in it closed position.

In some embodiments, the raised seal line may be located on the inner frame of the container and may comprise a sealing face which is configured to abut the lid when the lid is in its closed position.

In some embodiments, the raised seal line is located on an outer surface of the inner frame and is configured to abut an inner surface of the lid when the lid is in its closed position.

The inner frame may comprise a front wall which forms a front wall outer surface and side walls which form side wall outer surfaces, and wherein the raised seal line extends fully across the outer surfaces of the front and side walls.

In some embodiments, the raised seal line may be located on the lid and may comprise a sealing face which is configured to abut the inner frame of the container when the lid is in its closed position.

In some embodiments, the raised seal line is located on an inner surface of the lid and is configured to abut an outer surface of the inner frame of the container when the lid is in its closed position.

The lid may comprise a front wall having an internal panel which forms the front wall inner surface and side walls having internal panels which form the side wall inner surfaces, and wherein the raised seal line extends fully across the inner surfaces of the internal panels.

In some embodiments, the raised seal line may extend continuously around said portion of the inner frame and/or the inner surface of the lid.

In other embodiments, the raised seal line may be formed partially on said portion of the inner frame and partially on the inner surface of the lid such that when the lid is in its closed position the raised seal line extends continuously around an opening of the inner frame to a delivery system receiving space.

In some embodiments, the package may comprise a plurality of raised seal lines. The plurality of raised seal lines may be formed on said portion of the inner frame. Alternatively, the plurality of raised seal lines may be formed on the inner surface of the lid.

In one embodiment, at least one of the plurality of raised seal lines may be formed on said portion of the inner frame and at least one of the plurality of raised seal lines may be formed on the inner surface of the lid.

In some embodiments, at least one of the plurality of raised seal lines may be formed partially on said portion of the inner frame and partially on the inner surface of the lid.

A sealing face of the raised seal line may be raised from the surface on which the raised seal line is formed by a distance between 0.1 mm and 2 mm.

The raised seal line may be formed by structured ink. The raised seal line may be formed by varnish.

According to another aspect of the disclosure, there is provided a method of manufacturing a package, the method comprising forming a blank for an outer frame of a container and a lid, forming a blank for an inner frame of the container, forming a raised seal line on one of the blank for the inner frame of the container and/or the blank for the outer frame of the container and the lid, assembling the blanks to form a constructed outer frame of the container and the lid and a constructed inner frame of the container, and attaching the inner frame inside the outer frame of the container.

BRIEF DESCRIPTION OF THE DRAWINGS

So that the disclosure may be more fully understood, embodiments of the present invention will now be described, by way of example only, with reference to the accompanying drawings, in which:

FIG. 4 shows a second embodiment of a package with a lid in its open position.

DETAILED DESCRIPTION

As used herein the term "delivery system" is intended to encompass systems that deliver a substance to a user, and includes:

combustible aerosol provision systems, such as cigarettes, cigarillos, cigars, and tobacco pipes or for roll-your-own or for make-your-own cigarettes (whether based on tobacco, tobacco derivatives, expanded tobacco, reconstituted tobacco, tobacco substitutes or other smokeable material);

non-combustible aerosol provision systems that release compounds from an aerosolizable material without combusting the aerosolizable material, such as electronic cigarettes, tobacco heating products, and hybrid systems to generate aerosol using a combination of aerosolizable materials;

articles comprising aerosolizable material and configured to be used within one of these non-combustible aerosol provision systems; and aerosol-free delivery systems, such as lozenges, gums, patches, articles comprising inhalable powders, and smokeless tobacco products such as snus and snuff, which deliver a material to a user without forming an aerosol, wherein the material may or may not comprises nicotine.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

Figure 1:
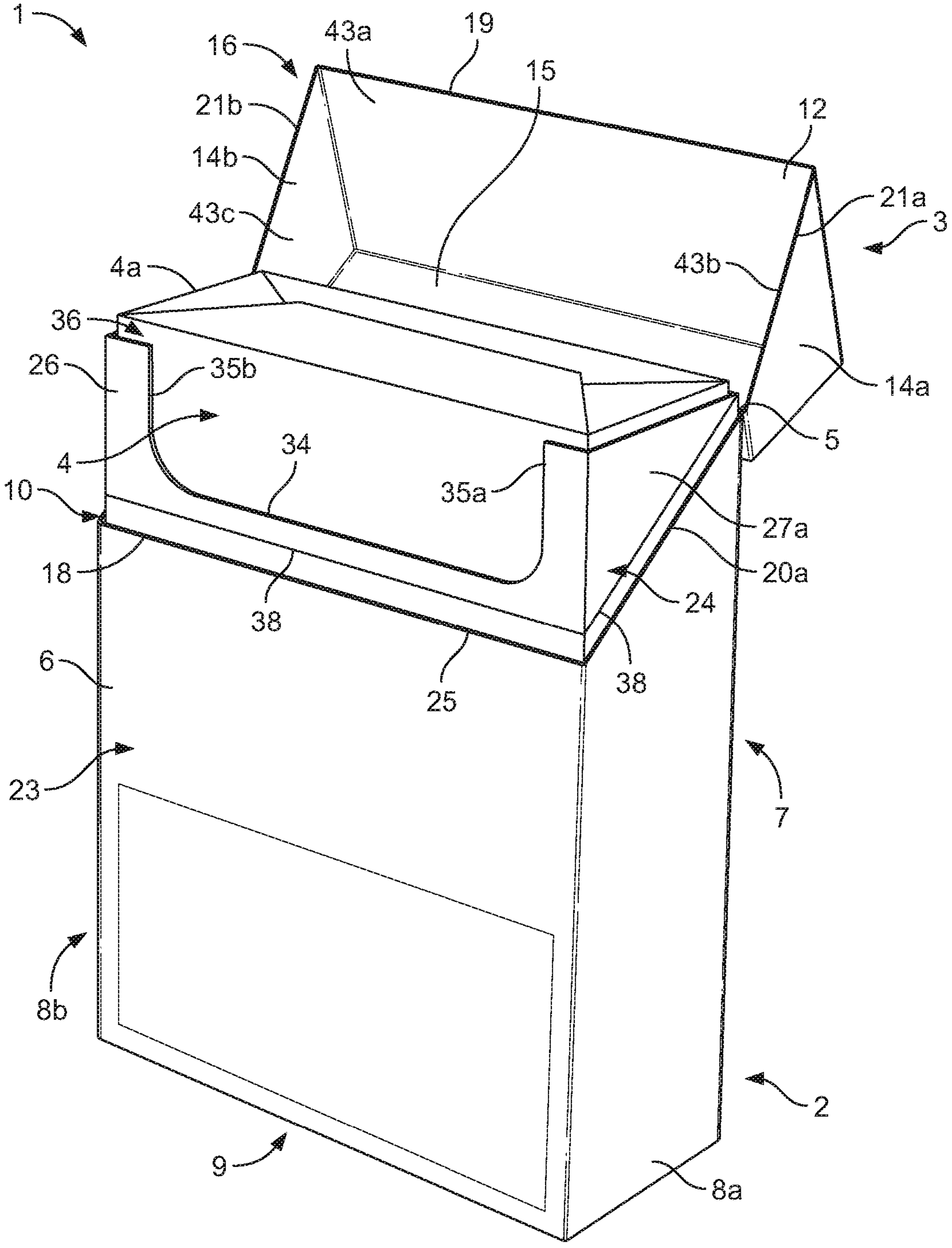
FIG. 1 shows a first embodiment of a package with a lid in its open position.

Referring to FIG. 1, a package 1 according to the present disclosure is shown. The package 1 comprises a container 2 and a lid 3. The container 2 forms a delivery system receiving space 4 in which delivery systems (wrapped in a bundle 4*a*) such as smoking articles are receivable. The lid 3 is attached to the container 2 along a hinge line 5, shown more clearly in FIG. 3, in order to allow the package 1 to be opened and closed. It will be appreciated that delivery systems in the delivery system receiving space 4 are accessible when the lid 3 is in an open position, and the delivery systems are retained in the delivery system receiving space 4 when the lid 3 is in a closed position, shown in FIG. 3.

The container 2 comprises a container front wall 6 and a container rear wall 7. The container front and rear walls 6, 7 are disposed parallel to but spaced from each other. The container 2 further comprises two opposing container side walls 8*a*, 8*b* which are disposed parallel to but spaced from one another. The two container side walls 8*a*, 8*b* extend between the container front and rear walls 6, 7. The container 2 further comprises a bottom wall 9 which forms a closed end of the container 2. The bottom wall 9 extends from a lower part of the container front, rear, and side walls, 6, 7, 8*a*, 8*b*. An upper end 10 of the container 2 is located opposite the bottom wall 9 and forms an open end of the container 2. The upper end 10 of the container 2 is covered by the lid 3 when the lid 3 is in its closed position. In the present embodiment, the hinge line 5 about which the lid 3 is hinged to the container 2 is formed along a top end of the container rear wall 7.

The lid 3 comprises a lid front wall 12 and a lid rear wall 13. The lid front and rear walls 12, 13 are disposed parallel to but spaced from each other. The lid 3 further comprises two opposing lid side walls 14*a*, 14*b* which are disposed parallel to but spaced from each other. The two lid side walls 14, 14*b* extend between the lid front and rear walls 12, 13. The lid 3 further comprises a top wall 15 which forms a closed end of the lid 3. The top wall 15 extends from an upper part of the lid front, rear, and side walls 12, 13, 14*a*, 14*b*. A lower end 16 of the lid 3 is located opposite the top wall 15 and forms an open end of the lid 3.

When the lid 3 is closed, an upper edge 18 of the container front wall 6 abuts a lower edge 19 of the lid front wall 12 and the upper edges 20*a*, 20*b* of the container side walls 8*a*, 8*b* abut the lower edges 21*a*, 21*b* of the lid side walls 14*a*, 14*b*. A lower edge 22 of the lid 3 is formed by the lower edge 19 of the lid front wall 12 and the lower edges 21*a*, 21*b* of the lid side walls 14*a*, 14*b*. The hinge line 5 is formed where the container rear wall 7 and lid rear wall 13 meet.

The container 2 of the package 1 as described above forms an outer frame 23. The outer frame 23 includes the walls of the container 2 of the package 1 that can be seen when the lid 3 in in its closed position. The package 1 further comprises an inner frame 24. The inner frame 24 also forms a part of the container 2. That is, the container 2 comprises the outer frame 23, as described above, and an inner frame 24, which will be described in more detail hereinafter. The upper edge 18 of the container front wall 6 and the upper edges 20 of the container side walls 8*a*, 8*b* form an upper edge 25 of the outer frame 23 of the container 2.

The inner frame 24 is configured to be placed inside the receiving space 4 proximate to or against the inner surface of the container front wall 6. As illustrated, the inner frame 24 has a portion that extends from the container 2. That is, a portion of the inner frame 24 extends from the open upper end 10 of the outer frame 23 of the container 2. The inner frame 24 is configured to add strength to a portion of the outer frame 23 in order to protect the delivery systems received in the delivery system receiving space 4.

The inner frame 24 of the container 2 comprises an inner front wall 26. The inner front wall 26 extends from the upper edge 18 of the container front wall 6 and in a plane parallel to the plane in which the container front wall 6 extends. The inner frame 24 of the container 2 further comprises two inner side walls 27*a*, 27*b*. The inner side walls 27*a*, 27*b* extend from the upper edges 20*a*, 20*b* of the container side walls 8*a*, 8*b* and in a plane parallel to the plane in which the container side walls 8*a*, 8*b* extend. That is, the inner front wall 26 extends parallel to the container front wall 6 and the inner side walls 27*a*, 27*b* extend parallel to the container side walls 8*a*, 8*b*.

Figure 3:
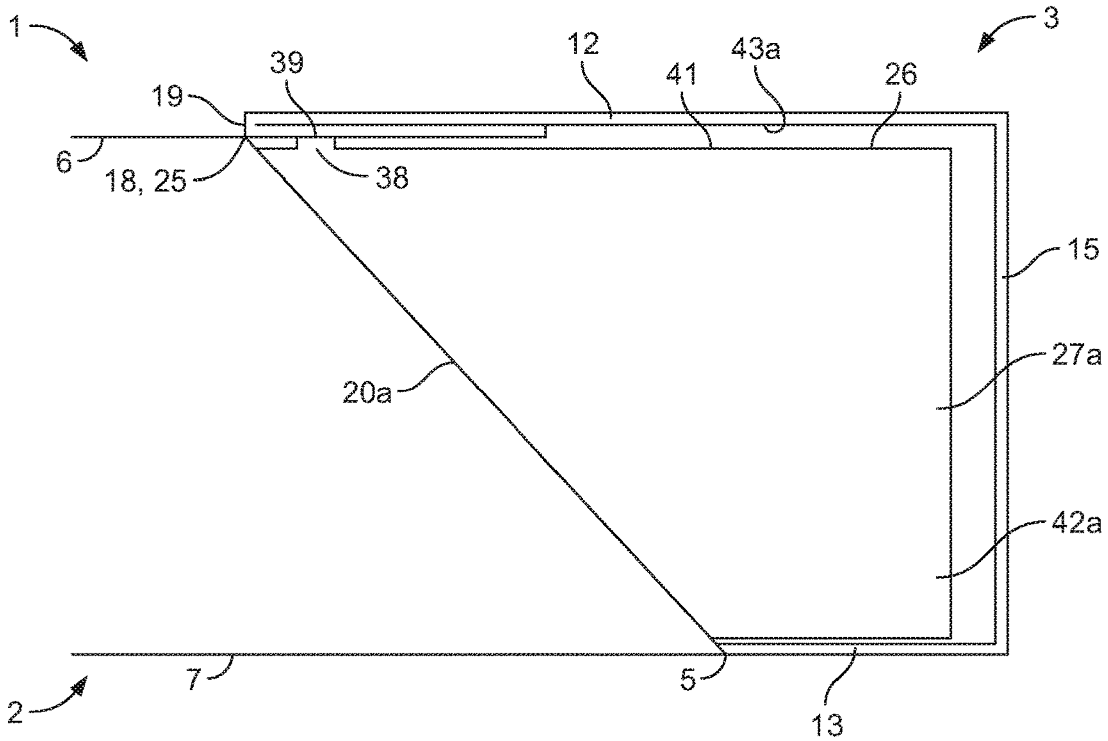
FIG. 3 shows a cross-sectional view of a top portion of the package shown in FIG. 1.
Figure 4A:
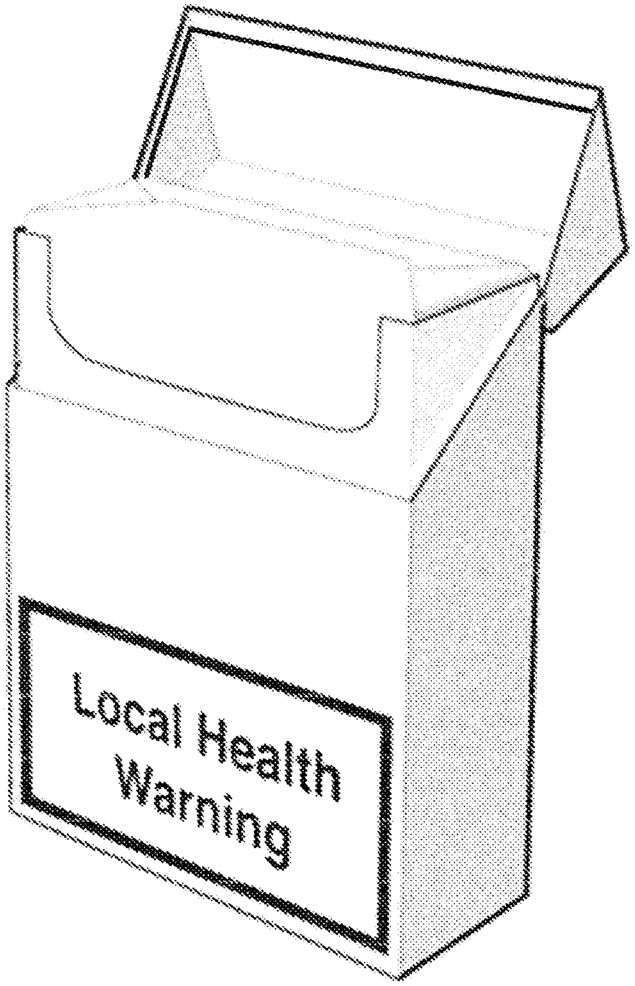
FIG. 4*a* shows another embodiment of a package with a lid in its open position.
Figure 4B:
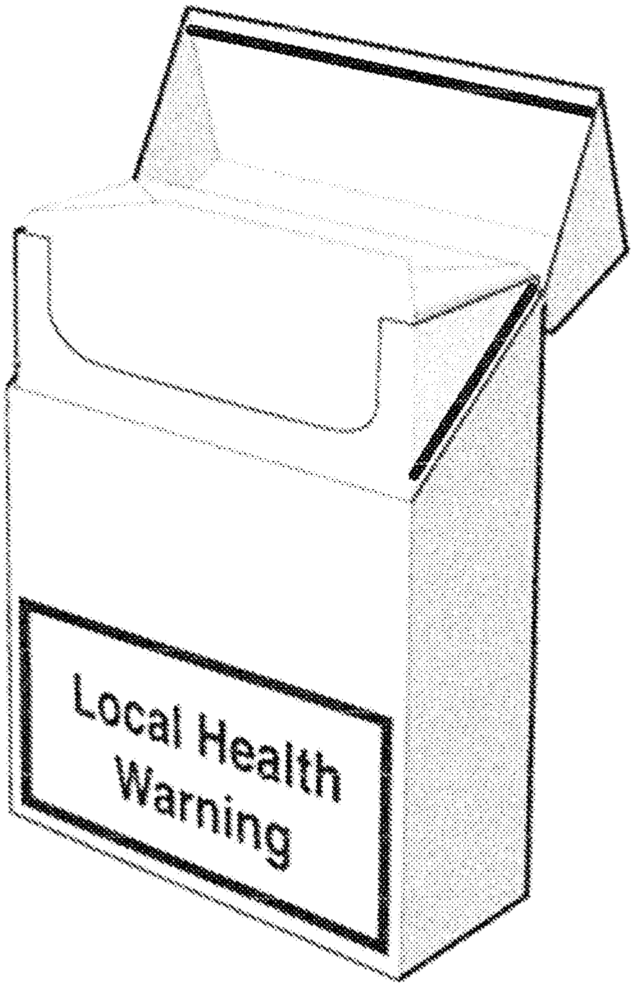
FIG. 4*b* shows another embodiment of a package with a lid in its open position.
Figure 4C:
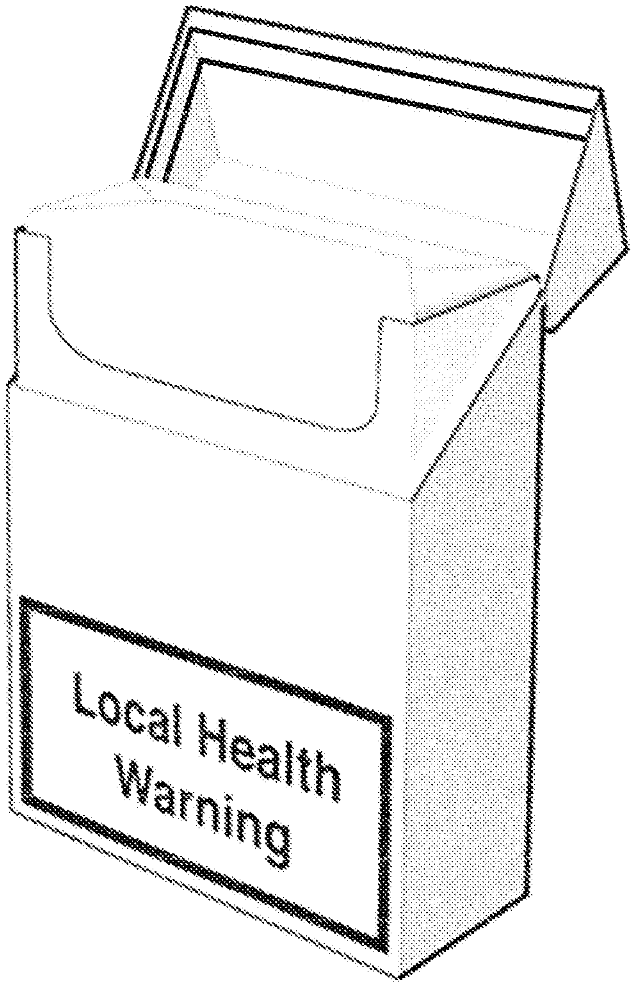
FIG. 4*c* shows another embodiment of a package with a lid in its open position.
Figure 4D:
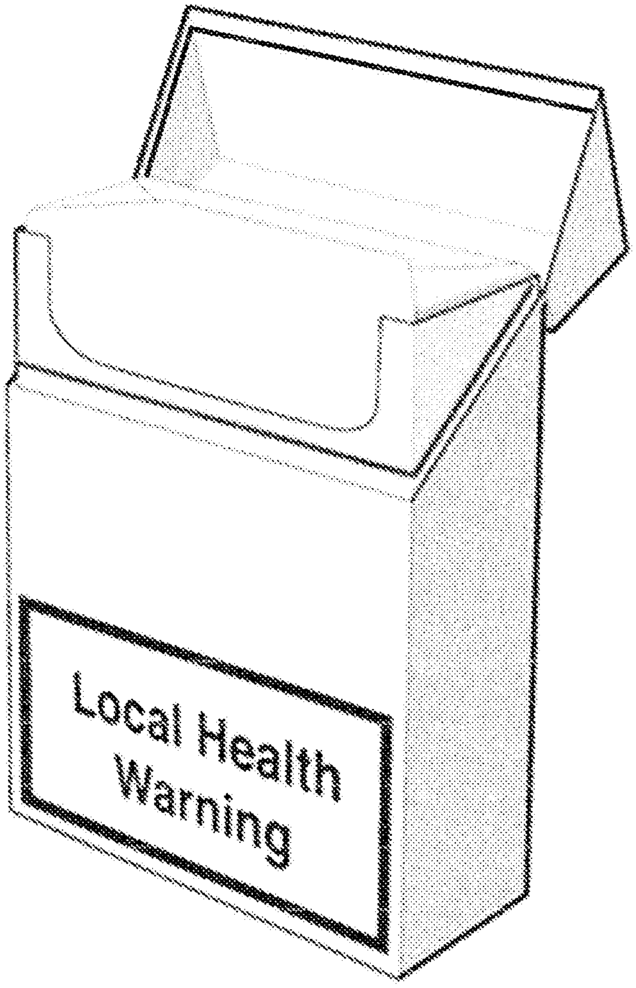
FIG. 4*d* shows another embodiment of a package with a lid in its open position.
Figure 4E:
FIG. 4*e* shows another embodiment of a package with a lid in its open position.

When the lid 3 is in the closed position, the lid front wall 12 lies substantially adjacent to and overlaps the inner front wall 26 of the container 2, as shown in FIG. 3, and the two lid side walls 14*a*, 14*b* lie adjacent to and overlap the corresponding inner side walls 27*a*, 27*b* of the container 2. Therefore, the lid 3 fits snuggly over the inner frame 24 when the lid 3 is in its closed position.

The inner front wall 26 of the inner frame 24 comprises an upper edge 28 which is spaced from the upper edge 18 of the container front wall 6 of the outer frame 23 of the container 2. Similarly, the inner side walls 27*a*, 27*b* of the inner frame 24 comprise upper edges 29*a*, 29*b* which are spaced from the upper edges 20 of the container side wall 8*a*, 8*b* of the outer frame 23 of the container 2. The upper edge 28 of the inner front wall 26 and the upper edges 29*a*, 29*b* of the inner side walls 27*a*, 27*b* form an upper edge 30 of the inner frame 24.

In the present embodiment illustrated in FIG. 1, the upper edge 28 of the inner front wall 26 of the inner frame 24 extends parallel to the upper edge of the container front wall 6 of the outer frame 23 of the container 2. Furthermore, the upper edges 29*a*, 29*b* of the inner side walls 27*a*, 27*b* of the inner frame 24 extend from the upper edge 28 of the inner front wall 26 towards the rear wall 7 of the outer frame 23 of the container 2 parallel to the bottom wall 9 of the container 2.

In the present embodiment, the upper edges 28, 29*a*, 29*b* of the inner frame 24 are located at the same vertical distance from the bottom wall 9 of the outer frame 23 of the container 2. Furthermore, the upper edges 28, 29*a*, 29*b* are all located above the hinge line 5 connecting the lid 3 to the container 2. However, in alternative embodiments, the upper edges of the inner frame 24 may have a different configuration. For example, the upper edges 29*a*, 29*b* of the inner side walls 27*a*, 27*b* may extend parallel to the upper edges 20*a*, 20*b* of the container side walls 8*a*, 8*b* of the outer frame 23 of the container 2 such that at least a part of the upper edges 29*a*, 29*b* of the inner side walls 27*a*, 27*b* are above the upper edge 26 of the inner front wall 26. In one embodiment, each of the upper edges may be completely below the hinge line 5 of the package 1 and/or the edges may be curved, etc.

In one embodiment, a cut-out (not shown) may be formed in the inner front wall 26 of the inner frame 24 so that the upper edge 28 of the front wall 26 of the inner frame 24 is below at least a part of the upper edges 29*a*, 29*b* of the side walls 27*a*, 27*b* of the inner frame 24.

The inner front wall 26 of the inner frame 24 also comprises a recess 32. The recess 32 extends in the inner front wall 26 of the inner frame 24 of the container 2. The recess 32 extends from the upper edge 28 of the inner front wall 26. The recess 32 has a lower edge 34, and side edges 35*a*, 35*b* which extend between the upper edge 26 of the inner front wall 26 and the lower edge 34 of the recess 32. In the present embodiment, the lower edge 34 of the recess 32 extends parallel to, but spaced from the upper edge 28 of the inner front wall 26 of the inner frame 24, and the side edges 35 of the recess 32 extend transverse to the lower edge 34. The edges 34, 35*a*, 35*b* define an opening 36 of the inner frame 24 to the delivery system receiving space 4. Delivery systems are inserted and removed by a user through the opening 36 defined by the edges 34, 35*a*, 35*b* of the inner frame 24.

The lower edge 34 of the recess 32 is spaced from the upper edge 18 of the container front wall 6 of the outer frame 23 of the container 2. The lower edge 34 of the recess 32 is spaced from the upper edge 18 of the container front wall 6 so that the front wall 12 of the lid 3 overlaps the inner front wall 26 of the container 2 along its entire width when the lid 3 is in its closed position. This reduces the gap through which contaminants can pass from outside of the package 1 into the delivery system receiving space 4.

It will be appreciated that in alternative embodiments, the shape, size, and positioning of the recess 32 in the inner frame 24 of the container 2 may vary. For example, the recess 32 may be a shape other than rectangular and may extend in a different wall of the inner frame 24 or in more than one wall.

The inner frame 24 of the container 2 may be a separate part of the package 1 to the outer frame 23 of the container 2. The inner frame 24 may be held in place in the outer frame 23 of the container 2 by, for example, but not limited to, glue. Alternatively, the outer and inner frames 23, 24 may be integrally formed.

The package 1 further comprises a raised seal line 38. The raised seal line 38 is configured to minimize a gap between the portion of the inner frame 24 and an inner surface of the lid 3 when the lid is in its closed position. In some embodiments, the raised seal line 38 may be configured to be in contact with the inner frame 24 of the container 2 and the inner surface of the lid 3 of the package 1 when the lid 3 is in its closed position, as shown in FIG. 3. Therefore, the raised seal line 38 is configured to ensure that there is no gap between the delivery system receiving space 4 and the outside of the package 1 that contaminants can pass through to travel from outside of the package 1 and into the delivery system receiving space 4 when the lid 3 is in its closed position.

The raised seal line 38 extends between the opening 36 of the inner frame 24 and the upper end 10 of the outer frame 23 of the container 2 when the lid 3 is in its closed position. Preferably, the raised seal line 38 extends around the opening 36 of the inner frame 24 when the lid 23 is in its closed position such that the delivery system receiving space 4 is sealed off from the outside of the package 1, as will be described in more detail below hereinafter, to prevent contaminants and moisture entering the package 1.

However, in some embodiments, the raised seal line 38 may only extend around a part of the opening 36 of the inner frame 24 when the lid 3 is in its closed position. For example, the raised seal line 38 may only extend between the upper edge 18 of the container front wall 6 of the outer frame 23 of the container 2 and the lower edge 34 of the recess 32 in the front wall 26 of the inner frame 24 of the container 2 when the lid 3 is in its closed position.

The raised seal line 38 may be formed by, for example, but not limited to, a line of varnish, a line of structured ink, or an embossed line. The line of varnish or structured ink may be printed, sprayed, painted, or otherwise deposited on the inner frame 24 of the container 2 or the lid 3. The line of varnish may be, for example, but not limited to, haptic varnish or overprint varnish. The line of structured ink may be, for example, but not limited to, tactile ink or soft touch ink. An example of tactile ink that may be used is 10-602335-1 WB TOB PV and an example of soft touch ink that may be used is 10-604644-4 WB TOB OPV. Preferably, the raised seal line 38 extends from the surface on which it is deposited or formed by a distance in the range of 0.1 mm to 2 mm. The raised seal line 38 may be deposited or imprinted on the inner frame 24 of the container 2 or on the lid 3 before the package 1 is assembled; that is, when the inner frame 24 or lid 3 is a blank that has not been constructed into a package 1, as will be described in more detail hereinafter.

In the embodiment shown in FIG. 1, the raised seal line 38 is formed on the inner frame 24 of the container 2. That is, the raised seal line 38 is formed on the part of the inner frame 24 which protrudes from the outer frame 23 of the container 2. The raised seal line 38 is located between the upper end 10 of the outer frame 23 of the container 2 and the opening 36 of the inner frame 24 of the container 2.

The raised seal line 38 comprises a sealing face 39, shown in FIG. 3. The sealing face 39 is configured to abut against the lid 3 when the lid 3 is in its closed position to seal the delivery system receiving space 4 from the atmosphere outside of the package 1. In the present embodiment, the sealing face 39 is a flat surface which extends parallel to the inner front wall 26 of the inner frame 24. However, it will be appreciated that in an alternative embodiment the raised seal line 38 may have a different shape such that the sealing face 39 may be, for example, but not limited to, curved or pointed.

Figure 2:
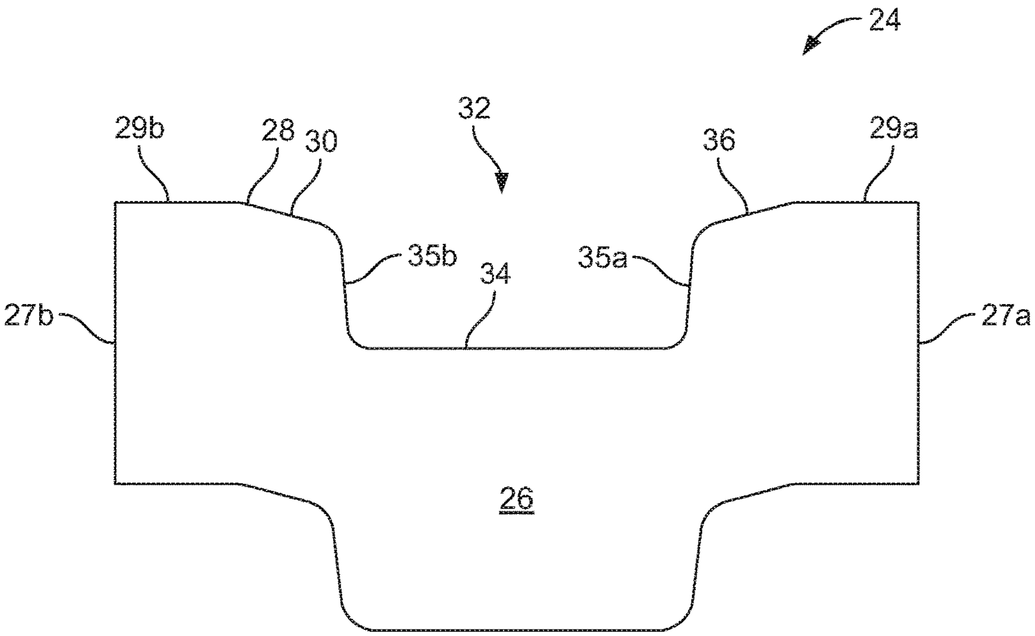
FIG. 2 shows a blank for forming an inner frame of the package shown in FIG. 1.

Referring briefly to FIG. 2, a blank 40 for forming the inner frame 24 of the container 2 can be seen. The raised seal line 38 is formed on an outer surface 41 of the inner front wall 26 of the inner frame 24, which is shown in both FIG. 1 and FIG. 2. The raised seal line 38 is configured to minimize a gap between the portion of the inner frame 24 and an inner surface of the lid 3 when the lid 3 is in its closed position.

Referring to FIGS. 1 and 2, the raised seal line 38 on the outer surface 41 of the inner front wall 26 is located between the lower edge 34 of the recess 32 in the inner front wall 26 and the upper edge 19 of the container front wall 6 of the outer frame 23 of the container 2. The raised seal line 38 on the outer surface 41 of the inner front wall 26 extends across the full width of the surface 41 from one inner side wall 27*a* to the opposing inner side wall 27*b*.

In the present embodiment, the raised seal line 38 on the outer surface 41 of the inner front wall 26 extends parallel to the upper edge 18 of the container front wall 6 of the outer frame 23 of the container 2. However, in an alternative embodiment, the raised seal line 38 may follow the contour of the edges 28, 34, 335*a*, 35*b* which form the opening 36 on the front wall 26 of the inner frame 24. In another embodiment, the contour or shape of the raised seal line 38 on the inner front wall 26 of the inner frame 24 of the container 2 may take any other form and be independent of the edges of the package 1.

The raised seal line 38 is also formed on outer surfaces 42*a*, 42*b* of the inner side walls 27*a*, 27*b* of the inner frame 24. The raised seal line 38 on the outer surfaces 42*a*, 42*b* of the inner side walls 27*a*, 27*b* are located between the upper edges 29*a*, 29*b* of the inner side walls 27*a*, 27*b* of the inner frame 24 and the upper edges 20*a*, 20*b* of the side walls 8*a*, 8*b* of the outer frame 23 of the container 2. The raised seal line 38 on the outer surfaces 42*a*, 42*b* extends across the full width of the surfaces 42*a*, 42*b* from the inner front wall 26 towards the rear wall 7 of the container 2.

In the present embodiment, the raised seal line 38 on the outer surfaces 42*a*, 42*b* of the inner side walls 27*a*, 27*b* extend parallel to the upper edges 29*a*, 29*b* of the inner side walls 27*a*, 27*b* of the inner frame of the container 2. However, in an alternative embodiment, the raised seal line 38 on the outer surfaces 42*a*, 42*b* of the inner side walls 27*a*, 27*b* extend parallel to the upper edges 20*a*, 20*b* of the side walls 8*a*, 8*b* of the outer frame 23 of the container 2. In another embodiment, the contour or shape of the raised seal line 38 on the side walls 27*a*, 27*b* of the inner frame 24 of the container 2 may take any other form and be independent of the edges of the package 1.

In some embodiments, the raised seal line 38 on the inner frame 24 is continuous. That is, the raised seal line 38 on the outer surface 41 of the inner front wall 26 of the inner frame 24 joins the raised seal line 38 on the outer surfaces 42*a*, 42*b* of the inner side walls 27*a*, 27*b* of the inner frame 24. Therefore, the raised seal line 38 extends across the whole of the inner frame 24 and surrounds the opening 36 of the inner frame 24. The same holds true for packages 1 with rounded edges instead of right angled corners as shown in FIG. 1.

The front wall 12 of the lid 3 comprises an inner surface 43*a*. The raised seal line 38 on the outer surface 41 of the inner front wall 26 of the inner frame 24 is configured to abut the inner surface 43*a* of the front wall 12 of the lid 3 when the lid 3 is in its closed position. Furthermore, the side walls 14*a*, 14*b* of the lid 3 comprise inner surfaces 43*b*, 43*c*. The raised seal line 38 on the outer surfaces 42*a*, 42*b* of the inner side walls 27*a*, 27*b* of the inner frame 24 are configured to abut the inner surfaces 43*b*, 43*c* of the side walls 14*a*, 14*b* of the lid 3 when the lid 3 is in its closed position. Therefore, contaminants are prevented from entering the receiving space 4 from outside the package 1 when the lid 3 is in its closed position.

In one embodiment, there may be a plurality of raised seal lines 38 on the inner frame 24. Each of the plurality of raised seal line 38 may be identical and spaced apart such that they extend parallel to each other on each of the inner front wall 26 and inner side walls 27*a*, 27*b* of the inner frame 24. In some embodiments, each raised seal line 38 may follow its own path, or contour, such that the raised seal lines 38 do not extend parallel across the whole of the inner frame 24. In yet further embodiments, at least one of the plurality of raised seal lines 38 may not extend across the whole of the inner frame 24 or may not extend continuously across the whole of the inner frame 24.

Referring to FIGS. 4, 4*a*, 4*b*, 4*c*, 4*d*, 4*e*, 5 and 6, an alternative embodiment of the package 44 according to the present disclosure is shown. The package 44 shown in FIGS. 4, 4*a*, 4*b*, 4*c*, 4*d*, 4*e*, 5 and 6 is generally the same as the first embodiment of the package 1 described above in relation to FIGS. 1 and 2 and so a detailed description will be omitted herein. Furthermore, features and components of the alternative package 44 that are the same as the features and components of the above described package 1 will retain the same terminology and reference numerals. However, the second embodiment of the package 44 differs from the first embodiment of the package 1 in that the raised seal line 38 is located on the lid 3 instead of on the inner frame 24 of the container 2.

Figure 5:
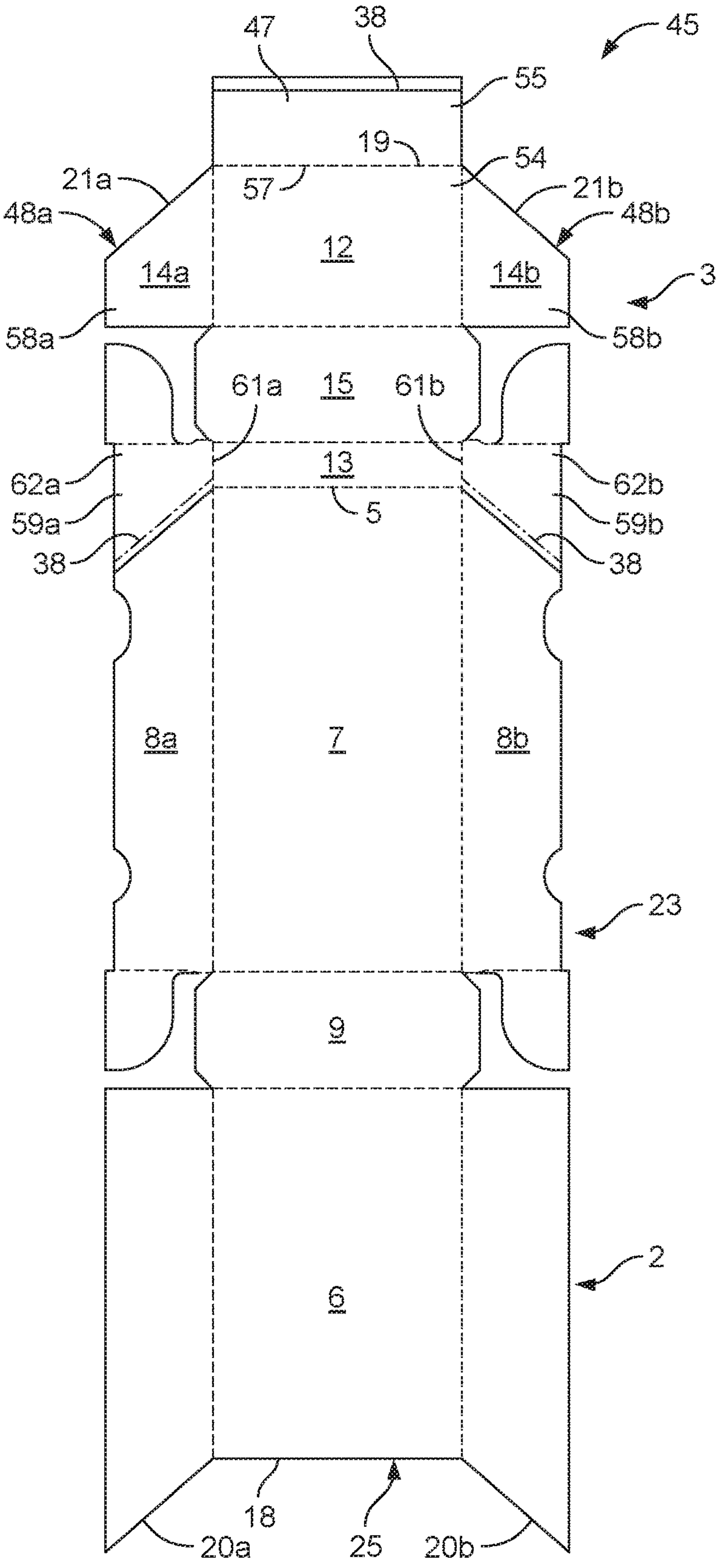
FIG. 5 shows a blank for forming an outer frame of the package shown in FIG. 6.

In an alternative embodiment, as shown in FIG. 4, the raised seal line 38 may be located on the lid 3 of the package 44 instead of on the inner frame 24 of the container 2. Referring briefly to FIG. 5, a blank 45 used to form the outer frame 23 of the package 44 illustrated in FIG. 4 is shown. The blank 45 is identical to a blank used for the outer frame 23 of the package 1 of FIG. 1 except for the addition of the raised seal line 38.

As can be seen in FIG. 4, the raised seal line 38 is located on an inner surface 47 of the front wall 12 of the lid 3 and on inner surfaces 48*a*, 48*b* of the side walls 14*a*, 14*b* of the lid 3. However, the raised seal line 38 still extends between the opening 36 of the inner frame 24 and the upper end 10 of the outer frame 23 of the container 2 when the lid 3 is in its closed position, as shown in FIG. 6.

Figure 6:
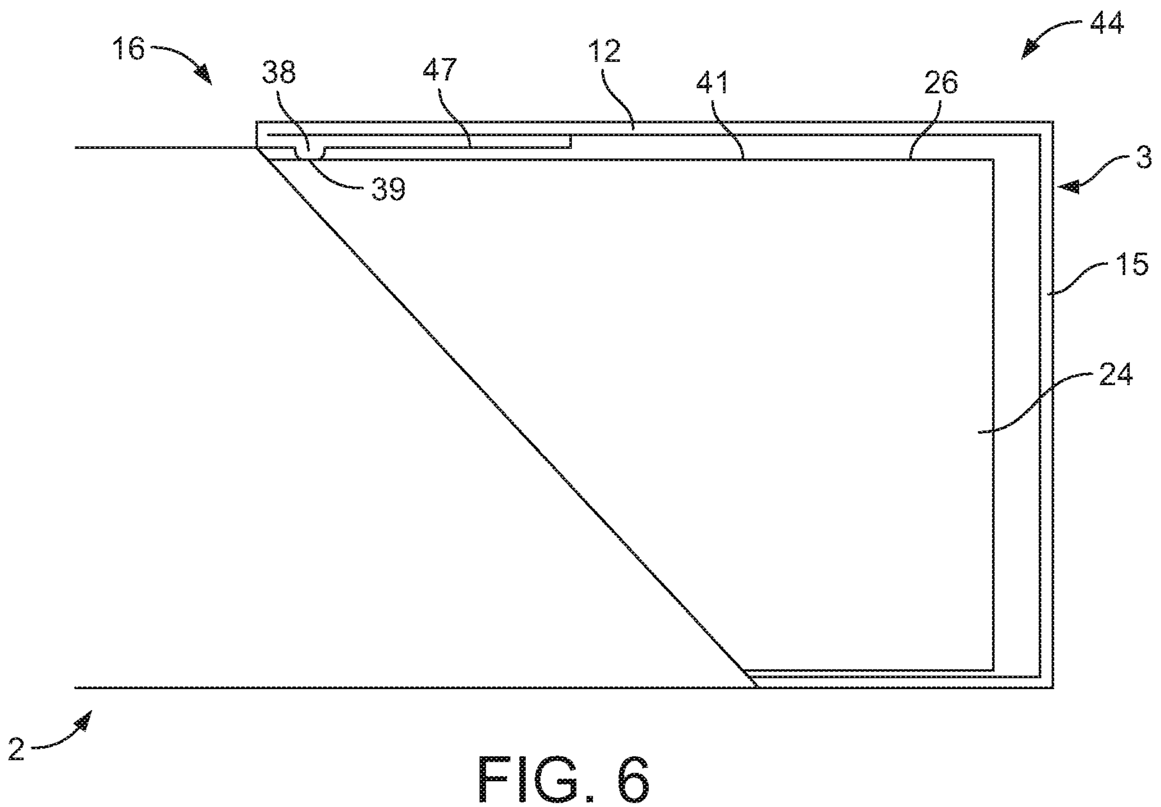
FIG. 6 shows a cross-sectional view of a top portion of the package shown in FIG. 3.

Referring to FIGS. 4 to 6, the raised seal line 38 on the inner surface 47 of the lid front wall 12 is located between the lower end 16 of the lid 3 and the top wall 15 of the lid 3 such that when the lid 3 is closed the sealing face 39 of the raised seal line 38 abuts the outer surface 41 of the inner front wall 26 of the inner frame 24 of the container 2 between the lower edge 34 of the recess 32 in the inner front wall 26 and the upper edge 19 of the container front wall 6 of the outer frame 23 of the container 2 or at least minimizes the gap between the inner frame 24 and the inner surface 47 of the lid 3 when the lid 3 is in its closed position. The raised seal line 38 on the inner surface 47 of the lid front wall 12 extends across the full width of the surface 47 from one side wall 14*a* to the opposing side wall 14*b*.

In the present embodiment, the raised seal line 38 on the inner surface 47 of the front wall 12 of the lid 3 extends parallel to the lower edge 19 of the front wall 12 of the lid 3 and the upper edge 18 of the container front wall 6 of the outer frame 23 of the container 2. However, in an alternative embodiment, the raised seal line 38 may follow a different path to the lower edge 19 of the lid 3. For example, the raised seal line 38 may follow the contour of the edges 28, 34, 35*a*, 35*b* which form the opening 36 on the front wall 26 of the inner frame 24. In another embodiment, the contour or shape of the raised seal line 38 on the inner surface 47 of the front wall 12 of the lid 3 may take any other form and be independent of the edges of the package 1.

The raised seal line 38 is also formed on inner surfaces 48*a*, 48*b* of the side walls 14*a*, 14*b* of the lid 3. The raised seal line 38 on the inner surfaces 48*a*, 48*b* of the side walls 14*a*, 14*b* are located between the lower edges 21*a*, 21*b* of the side walls 14*a*, 14*b* of the lid 3 and the top wall 15 of the lid 3. The raised seal line 38 on the inner surfaces 48*a*, 48*b* extends across the full width of the surfaces 48*a*, 48*b* from the inner surface 47 of the front wall 12 of the lid 3 towards the rear wall 13 of the lid 3.

In the present embodiment, the raised seal line 38 on the inner surfaces 48*a*, 48*b* of the side walls 14*a*, 14*b* extend parallel to the lower edges 21*a*, 21*b* of the side walls 14*a*, 14*b* of the lid 3. However, in an alternative embodiment, the raised seal line 38 on the inner surfaces 48*a*, 48*b* of the side walls 14*a*, 14*b* may extend parallel to the upper edges 29*a*, 29*b* of the side walls 27*a*, 27*b* of the inner frame 24 of the container 2. In another embodiment, the contour or shape of the raised seal line 38 on the side walls 14*a*, 14*b* of the lid 3 may take any other form and be independent of the edges of the package 1.

In some embodiments, the raised seal line 38 on the lid 3 is continuous. That is, the raised seal line 38 on the inner surface 47 of the front wall 12 of the lid 3 joins the raised seal line 38 on the inner surfaces 48*a*, 48*b* of the side walls 14*a*, 14*b* of the lid 3. Therefore, the raised seal line 38 extends across the whole of the lid 3 and surrounds the opening 36 of the inner frame 24 when the lid is in the closed position. The same holds true for packages 1 with rounded edges instead of right angled corners as shown in FIG. 4.

The raised seal line 38 on the inner surface 47 of the inner front wall 12 of the lid 3 is configured to abut the outer surface 41 of the inner front wall 26 of the inner frame 24 of the container 2 when the lid 3 is in its closed position. Furthermore, the raised seal line 38 on the inner surfaces 48*a*, 48*b* of the side walls 14*a*, 14*b* of the lid 3 is configured to abut the outer surfaces 42*a*, 42*b* of the inner side walls 27*a*, 27*b* of the inner frame 24 of the container 2 when the lid 3 is in its closed position. Therefore, contaminants are prevented from entering the receiving space 4 from outside the package 44 when the lid 3 is in its closed position.

Referring to FIG. 5, the blank 45 for the outer frame 23 of the package 44 is shown. It is the same as the blank (not shown) of the outer frame 23 of the package 1 of the previous embodiment except for the addition of the raised seal line 38 on the lid 3.

From FIG. 5, it can be seen that when the raised seal line 38 is applied to the blank 45 prior to folding of the blank 45 into the package the raised seal line 38 does not form a continuous line across the blank 45. However, due to the folding process during the manufacture of the package 44, once the package 44 is complete, the raised seal line 38 forms a continuous line.

The blank 45 comprises the container 2 and the lid 3 connected about the hinge line 5 which extends between the rear wall 7 of the container 2 and the rear wall 13 of the lid 3. The rear wall 13 of the lid 3 is connected by a fold line 51 to the top wall 15 of the lid 3 and a fold line 52 on the opposing side of the top wall 15 is connected to the front wall 12 of the lid 3. The front wall 12 of the lid 3 comprises an external panel 54 and an internal panel 55 connected by a fold line 57. The fold lines of the blanks are shown in dotted lines in the drawings. The internal panel 55 is folded along the fold line 57 and attached to an inner surface (not shown) of the external panel 54. Therefore, a surface 47 of the internal panel 55 of the front wall 12 of the lid 3 forms the inner surface 47 of the lid 3 on which the raised seal line 38 is formed.

The side walls 14*a*, 14*b* of the lid 3 comprise external panels 58*a*, 58*b* and internal panels 59*a*, 59*b*. The external panels 58*a*, 58*b* of the side walls 14*a*, 14*b* are connected to the external panel 54 of the front wall 12 of the lid 3 by fold lines 60*a*, 60*b* on opposing sides of the front wall 12. The internal panels 59*a*, 59*b* of the side walls 14*a*, 14*b* extend from the rear wall 13 of the lid 3 and are connected to the rear wall 13 by fold-lines 61*a*, 61*b*.

When the package 44 is formed from the blank 45, outer surfaces 62*a*, 62*b* of the internal panels 59*a*, 59*b* are attached to an inner surface (not shown) of the external panels 58*a*, 58*b*. In the present embodiment, the internal panels 59*a*, 59*b* are the same size inner surface of the external panels 58*a*, 58*b* such that the inner surfaces 48*a*, 48*b* are formed solely by inner surfaces 63*a*, 63*b* of the internal panels 59*a*, 59*b* of the side walls 14*a*, 14*b*. Therefore, the inner surfaces 63*a*, 63*b* of the internal panels 59*a*, 59*b* of the side walls 14*a*, 14*b* of the lid 3 form the inner surfaces 48*a*, 48*b* on which the raised seal line 38 is formed, shown in dashed lines in FIG. 5.

In an alternative embodiment, the internal panels 59*a*, 59*b* may be slightly smaller than the inner surface of the external panels 58*a*, 58*b* such that the inner surfaces 48*a*, 48*b* are formed by inner surfaces 63*a*, 63*b* of the internal panels 59*a*, 59*b* of the side walls 14*a*, 14*b* and by a part of the inner surfaces of the external panels 58*a*, 58*b* of the side walls 14*a*, 14*b*. Therefore, the inner surfaces 63*a*, 63*b* of the internal panels 59*a*, 59*b* and the inner surfaces of the external panels 58*a*, 58*b* of the side walls 14*a*, 14*b* of the lid 3 form the inner surfaces 48*a*, 48*b* on which the raised seal line 38 is formed.

Therefore, in each of the above mentioned embodiments of the package 44, when the blank 45 is assembled into the outer frame 23 of the package 44 and the lid 3 is in the closed position, the raised seal line 38 forms a continuous line around the opening 36 to the delivery system receiving space 4 in order to form a barrier to contaminants entering the receiving space 4 from outside of the package 44.

In one embodiment, there may be a plurality of raised seal lines on the inner surface of the lid 3. Each of the plurality of raised seal line 38 may be identical, or substantially identical, and spaced apart such that they extend parallel to each other on each of the inner surface 47 of the inner front wall 12 and the inner surfaces 48*a*, 48*b* of the side walls 14*a*, 14*b* of the lid 3. In some embodiments, each raised seal line 38 may follow its own path, or contour, such that the raised seal lines 38 do not extend parallel across the whole of the lid 3. In yet further embodiments, at least one of the plurality of raised seal lines 38 may not extend across the whole of the inner surfaces 47, 48*a*, 48*b* of the front and side walls 12, 14*a*, 14*b* of the lid 3 or may not extend continuously across the whole of the inner surfaces of the lid 3.

In another embodiment of the package for delivery systems, the package may comprise a raised seal line 38 on both the inner frame 24 and the inner surface 47 of the lid 3. The raised seal lines 38 may be configured such that when the lid 3 is in its closed position, the raised seal line 38 on the inner surface 47 of the lid 3 is offset from the raised seal line 38 on the inner frame 24 so that there are two raised seal lines 38 which are configured to minimize the gap between the portion of the inner frame 24 and the inner surface 47 of the lid 3 when the lid 3 is in its closed position.

Alternatively, the raised seal lines 38 may be configured such that when the lid 3 is in its closed position, the raised seal line 38 on the inner surface 47 of the lid 3 is in contact with the raised seal line 38 on the inner frame 24. In some embodiments, the raised seal line 38 on the lid 3 may have to locate over the raised seal line 38 on the inner frame 24 when the lid 3 is moved into its closed position. In some embodiments, both, or only one of, the inner frame 24 and the inner surface 47 of the lid 3 may comprise a plurality of raised seal lines 38.

In another embodiment of the package for delivery systems, the raised seal line 38 may be formed partially on the portion of the inner frame 24 which extends from the container portion 2 and formed partially on the inner surface of the lid 3. The parts of raised seal line 38 on the inner frame 24 and the inner surfaces of the lid 3 are configured such that when the lid 3 is in its closed position, the raised seal line 38 extends continuously around the opening 36 of the inner frame 24 to the receiving space 4 for delivery systems.

For example, the package may comprise a part of a raised seal line 38 on the inner surface 47 of the inner front wall 12 of the lid 3 and a part of a raised seal line 38 on the outer surfaces 42*a*, 42*b* of the inner side walls 27*a*, 27*b* of the inner frame 24. The parts of the raised seal line 38 on the inner surface 47 of the lid 3 and the outer surfaces 42*a*, 42*b* of the inner frame 24 are configured such that they are positioned on the lid 3 and inner frame 24 such that they contact one another when the lid 3 is in its closed position to form a continuous raised seal line 38.

The embodiments of the package may comprise a pair of ears, which are not shown in the drawings but are well known in the art. The pair of ears extend outwardly sideways from the container side walls 8*a*, 8*b*. Each ear extends perpendicularly from the container side walls 8*a*, 8*b* parallel to and from the container front wall 6. Each ear is formed by means of a cut line formed in the container side walls 8*a*, 8*b*. The raised seal line 38 may extend along the ears in some embodiments. An advantage of the package having ears if that the ears are able to be disposed to extend from the container side walls to help retain the lid 3 in the closed position.

Embodiments of the invention are described with reference to delivery systems, for example cigarettes. However, it will be appreciated that packages of the disclosure may alternatively be used for non-tobacco industry related products.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilized and modifications may be made without departing from the scope of the claimed invention. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claims, but which may be claimed in future.

The invention claimed is:

1. A package for one or more delivery systems comprising:

a container;

a lid hingedly connected to the container about a hinge line; and an inner frame received in the container and having a portion that extends from the container which is received in the lid when the lid is closed, wherein a raised seal line is formed on at least one of the portion of the inner frame or on an inner surface of the lid, the raised seal line being configured to minimize a gap between the portion of the inner frame and the inner surface of the lid when the lid is in a closed position, and wherein the raised seal line extends around an opening of the inner frame when the lid is in the closed position such that a delivery system receiving space is sealed off from an outside of the package.

2. The package according to claim 1, wherein the raised seal line contacts the inner frame and the lid when the lid is in the closed position.

3. The package according to claim 1, wherein the container comprises an upper edge spaced from an upper edge of the inner frame, and wherein the raised seal line contacts the inner frame between the upper edge of the container and the upper edge of the inner frame when the lid is in the closed position.

4. The package according to claim 1, wherein the raised seal line is located on the inner frame of the container and comprises a sealing face which is configured to abut the lid when the lid is in the closed position.

5. The package according to claim 4, wherein the raised seal line is located on an outer surface of the inner frame and is configured to abut an inner surface of the lid when the lid is in the closed position.

6. The package according to claim 5, wherein the inner frame comprises a front wall which forms a front wall outer surface and side walls which form side wall outer surfaces, and wherein the raised seal line extends fully across the outer surfaces of the front wall and the side walls.

7. The package according to claim 1, wherein the raised seal line is located on the lid and comprises a sealing face which is configured to abut the inner frame of the container when the lid is in the closed position.

8. The package according to claim 7, wherein the raised seal line is located on an inner surface of the lid and is configured to abut an outer surface of the inner frame of the container when the lid is in the closed position.

9. The package according to claim 8, wherein the lid comprises a front wall having an internal panel which forms the front wall inner surface and side walls having internal panels which form the side wall inner surfaces, and wherein the raised seal line extends fully across the inner surfaces of the internal panel.

10. The package according to claim 1, wherein the raised seal line extends continuously around at least one of the portion of the inner frame or the inner surface of the lid.

11. The package according to claim 1, wherein the raised seal line is formed partially on the portion of the inner frame and partially on the inner surface of the lid such that when the lid is in the closed position the raised seal line extends continuously around an opening of the inner frame to the delivery system receiving space.

12. The package according to claim 1, further comprising a plurality of raised seal lines.

13. The package according to claim 12, wherein the plurality of raised seal lines are formed on the portion of the inner frame.

14. The package according to claim 12, wherein the plurality of raised seal lines are formed on the inner surface of the lid.

15. The package according to claim 12, wherein at least one of the plurality of raised seal lines is formed on the portion of the inner frame and at least one of the plurality of raised seal lines is formed on the inner surface of the lid.

16. The package according to claim 12, wherein at least one of the plurality of raised seal lines is formed partially on the portion of the inner frame and partially on the inner surface of the lid.

17. The package according to claim 1, wherein a sealing face of the raised seal line is raised from the surface on which the raised seal line is formed by a distance between 0.1 mm and 2 mm.

18. The package according to claim 1, wherein the raised seal line is formed by structured ink.

19. The package according to claim 1, wherein the raised seal line is formed by varnish.

* * * * *